US012071328B2

(12) United States Patent
Kouhia et al.

(10) Patent No.: US 12,071,328 B2
(45) Date of Patent: Aug. 27, 2024

(54) SPREADER POSITION CONTROL

(71) Applicant: KALMAR FINLAND OY, Tampere (FI)

(72) Inventors: Jyrki Kouhia, Julkujärvi (FI); Jyri Lukkala, Tampere (FI); Tomi Tuulkari, Hämeenkyrö (FI); Mikko Asikainen, Kangasala (FI)

(73) Assignee: KALMAR FINLAND OY, Tampere (FI)

( * ) Notice: Subject to any disclaimer, the term of this patent is extended or adjusted under 35 U.S.C. 154(b) by 0 days.

(21) Appl. No.: 17/766,270

(22) PCT Filed: Oct. 2, 2020

(86) PCT No.: PCT/FI2020/050649

§ 371 (c)(1),
(2) Date: Apr. 4, 2022

(87) PCT Pub. No.: WO2021/064294

PCT Pub. Date: Apr. 8, 2021

(65) Prior Publication Data

US 2024/0051798 A1 Feb. 15, 2024

(30) Foreign Application Priority Data

Oct. 4, 2019 (FI) ...................................... 20195848

(51) Int. Cl.
*B66C 13/46* (2006.01)
*B66C 13/48* (2006.01)

(52) U.S. Cl.
CPC .............. *B66C 13/46* (2013.01); *B66C 13/48* (2013.01)

(58) Field of Classification Search
CPC ........ B66C 13/46; B66C 13/48; B66C 13/085
See application file for complete search history.

(56) References Cited

U.S. PATENT DOCUMENTS 5,455,567 A * 10/1995 Simmons ................ B66C 15/00 212/281
11,262,189 B2 * 3/2022 Mannari ................ G06V 20/64
(Continued)

FOREIGN PATENT DOCUMENTS

CN 201125130 Y 10/2008
CN 102145859 A 8/2011
(Continued)

OTHER PUBLICATIONS

JP 6070426 B2 Machine Translation (Year: 2017).*
(Continued)

*Primary Examiner* — Michael R Mansen
*Assistant Examiner* — Juan J Campos, Jr.
(74) *Attorney, Agent, or Firm* — Harness, Dickey & Pierce, P.L.C.

(57) ABSTRACT

A method of providing position control information for controlling the movement of a spreader (400) of a crane (10) towards a spreader target position is disclosed. The method comprises measuring both the distance to the loading/unloading target position (32, 36) and the distance to a position of the spreader (400) for determining both a loading/unloading target position (32, 36) and the position of the spreader (400) in a fixed coordinate system. The method also comprises causing position control information corresponding to the position of the spreader (400) and the loading/unloading target position (32, 36) to be transmitted to the crane (10).

16 Claims, 5 Drawing Sheets

(56) References Cited

U.S. PATENT DOCUMENTS

| | | | | |
|---|---|---|---|---|
| 2002/0191813 | A1* | 12/2002 | Uchida | B66C 13/46 382/104 |
| 2004/0125985 | A1 | 7/2004 | Heidenback et al. | |
| 2004/0126015 | A1* | 7/2004 | Hadell | B66C 19/002 382/181 |
| 2005/0192702 | A1* | 9/2005 | Moutsokapas | B66C 13/48 700/213 |
| 2005/0281644 | A1* | 12/2005 | Lussen | B66C 13/085 414/403 |
| 2006/0042397 | A1* | 3/2006 | Kurita | G01V 5/20 73/800 |
| 2010/0243593 | A1* | 9/2010 | King | B66C 13/46 701/50 |
| 2011/0017693 | A1* | 1/2011 | Thomas | G06Q 10/08 212/270 |
| 2011/0163159 | A1* | 7/2011 | Thomas | G06Q 10/08 235/384 |
| 2011/0238208 | A1* | 9/2011 | Kleine | B66C 13/48 700/218 |
| 2013/0147640 | A1* | 6/2013 | Stocker | B66C 13/16 340/928 |
| 2014/0285330 | A1* | 9/2014 | Kouhia | B66C 19/002 340/425.5 |
| 2015/0191333 | A1* | 7/2015 | Kouhia | G01S 17/42 356/614 |
| 2015/0307330 | A1* | 10/2015 | Suzuki | B66C 13/08 701/50 |
| 2018/0044144 | A1* | 2/2018 | Nieminen | G01S 7/4813 |
| 2018/0170720 | A1* | 6/2018 | Mannari | G01S 7/481 |
| 2020/0017318 | A1* | 1/2020 | Mannari | G06V 20/10 |

FOREIGN PATENT DOCUMENTS

| | | | |
|---|---|---|---|
| EP | 1337454 | A1 | 8/2003 |
| JP | 2002255476 | A | 9/2002 |
| JP | 2014237528 | A | 12/2014 |
| JP | 6070426 | B2 | 2/2017 |
| KR | 20110123929 | A | 11/2011 |
| WO | 0234663 | A1 | 5/2002 |
| WO | WO-2012152984 | A1 | 11/2012 |
| WO | 2013076366 | A1 | 5/2013 |
| WO | WO-2016001481 | A1 | 1/2016 |
| WO | 2018167366 | A1 | 9/2018 |

OTHER PUBLICATIONS

Search Report issued in corresponding Finnish Patent Application No. 20195848 dated Jan. 30, 2020.

International Search Report and Written Opinion of the International Search Authority, issued in PCT/FI2020/050649, mailed Feb. 2, 2021; ISA/EP.

International Preliminary Report on Patentability issued in PCT/FI2020/050649, mailed May 20, 2021.

First Office Action in corresponding Chinese Patent Application No. 202080069148.4 dated Feb. 22, 2023.

* cited by examiner

SPREADER POSITION CONTROL

CROSS-REFERENCE TO RELATED APPLICATIONS

This application is a 371 U.S. National Phase of International Application No. PCT/FI2020/050649, filed Oct. 2, 2020, which claims priority to Finnish Patent Application No. 20195848, filed Oct. 4, 2019. The entire disclosures of the above applications are incorporated herein by reference.

FIELD

The present disclosure relates to cranes with spreaders. In particular, the disclosure relates to providing position control information for guiding a spreader towards its target for loading and/or unloading.

BACKGROUND

Cranes are used in loading and/or unloading terminals such as container freight terminals. There, containers are loaded into vehicles and/or unloaded from vehicles by picking the containers up with a spreader of a crane which itself is coupled to a trolley of a crane. The containers being massive objects, care must be taken in moving and positioning them, in particular since the spreader used to move them hangs from a set of extended ropes, adding a further degree of uncertainty in their movement. Moreover, to be able to position the containers for transport, they typically have very accurately defined mounting points both on themselves and on any vehicles adapted to carry them.

To be able to position the spreader with respect to its target, i.e. with respect to a loading platform on a vehicle during loading, when the spreader is holding a container, or a container on a vehicle during unloading, when the spreader is empty, multiple measurement systems are typically required. This is because both the loading/unloading target position and the position of the spreader with respect to the target need to be determined accurately enough for loading and/or unloading to be possible and, moreover, fast and safe. As an example, and since positioning the spreader ultimately requires positioning the crane and the trolley, one measurement system may be configured to determine the loading/unloading target position, another measurement system may be configured to determine position of the trolley and a third measurement system may be configured to determine the position of the spreader with respect to the trolley.

Using multiple measurement systems requires the systems to be accurately synchronized with respect to each other. Consequently, they also need to be calibrated using the same references. What is more, the systems are exposed to accumulation of measurement errors, which can lead to insufficient accuracy for positioning the spreader.

OBJECTIVE

An objective is to eliminate or alleviate at least some of the disadvantages mentioned above.

In particular, it is an objective to provide a system, an apparatus and a method for providing position control information allowing guiding a spreader towards its target using only one measurement system.

SUMMARY

By container it is meant here a shipping container such as an intermodal freight container. A container may comprise one or more mounting points such as twistlocks.

The invention disclosed herein can be used in a loading/unloading terminal (hereafter also "terminal") such as a container freight terminal. The terminal may be partially or fully automated so that loading/unloading can be arranged to take place with limited or no human interaction. The terminal comprises terminal infrastructure, which may include buildings and structures for operating the terminal, such as fences or posts for guiding traffic. The terminal may comprise one or more lanes for loading/unloading.

By load it is meant here the cargo loaded and/or unloaded by a crane, e.g. to and/or from a vehicle such as a truck or a train. The load may comprise one or more containers.

By loading/unloading it is meant here the process of loading and/or unloading a load with a crane. The loading can correspond to loading a vehicle so that loading can be considered as the process of positioning a container on a vehicle. The unloading can correspond to unloading a vehicle so that unloading can be considered as the process of picking a container from a vehicle.

By loading/unloading target position it is meant here the position with respect to which the spreader is to be positioned for releasing a load during loading and/or the position with respect to which the spreader is to be positioned for picking up a load during unloading. Correspondingly, the loading/unloading target position may correspond to the position of the load, e.g. the position of a container, during unloading or the position for placing the load, e.g. the position of a trailer or the position of one or more twistlocks, during loading. The loading/unloading target position can be on a loading/unloading platform, e.g. that of a vehicle. The vehicle may comprise a trailer and the loading/unloading target position may be on the trailer. Correspondingly, the spreader target position is the position to which the spreader is to be positioned for releasing a load during loading and/or the position with respect to which the spreader is to be positioned for engaging with a load for pick-up during unloading. The spreader target position can therefore be above a loading/unloading platform, e.g. that of a vehicle.

By independently moving the spreader, it is meant here moving the spreader and/or parts of the spreader arranged to hold the load while the crane, including a trolley of the crane from which the spreader may be hanging, remain stationary. For this purpose, the latitude of the spreader and/or the parts of the spreader arranged to hold the load may be altered. Alternatively or additionally, also the lateral position of the spreader and/or parts of the spreader arranged to hold the load may be altered e.g. with spreader micromovements.

By positioning the crane for loading/unloading, it is meant here positioning the crane so that the spreader can be moved to the spreader target position by independently moving the spreader.

Position control information is information that can be used for controlling the movement of the spreader to the spreader target position or towards the spreader target position. For example, it may comprise the distance to the loading/unloading target position and/or the distance to the position of the spreader for determining the position of the spreader of a crane and/or a loading/unloading target position. Alternatively or additionally, it may comprise the position of the spreader of a crane and/or a loading/unloading target position. Yet alternatively or additionally, it may comprise information derived from the position of the spreader of a crane and the loading/unloading target position, for example control instructions for moving the spreader to the spreader target position or towards the spreader target position wherein the control instructions are determined based on the position of the spreader and the loading/unloading target position. The actual control instructions for guiding the movement of the crane may therefore be determined, partially or completely, also outside the crane, for example in one or more mediators. Unless specifically stated otherwise, position control information corresponding to the position of the spreader of a crane and/or a loading/unloading target position can mean any of the abovementioned examples, i.e., position as such, information for determining the position such as distance measurement data or information derived from the position.

In general, any measurement data and/or control data can be processed and/or generated in various locations so unless explicitly stated to the contrary, it should be understood that information such as any measurement data, control information or the like can be processed remotely and/or locally. The processing need not necessarily take place in the apparatus that generated the information or utilizes the information.

According to a first aspect, an apparatus may be arranged to provide position control information corresponding to a position of a spreader of a crane and a loading/unloading target position. The apparatus comprises one or more detectors, which may be arranged to measure distance. This allows the one or more detectors to be arranged to measure distance to both the position of the spreader and the loading/unloading target position for determining both the loading/unloading target position and the position of the spreader in a fixed coordinate system. The apparatus further comprises a transmitter which may be arranged to cause position control information to be transmitted to the crane. The one or more detectors, or even the whole apparatus, can be arranged to be positioned in the crane and/or in terminal infrastructure. The apparatus is arranged to measure, using the one or more detectors, both the distance to the loading/unloading target position and the distance to the position of the spreader. Specifically, the apparatus is arranged to perform the measurement so that it allows determining both the loading/unloading target position and the position of the spreader in a fixed coordinate system, e.g. a stationary coordinate system, i.e. defined as constant with respect to the terminal. While the apparatus can be arranged to determine the loading/unloading target position and the position of the spreader in a fixed coordinate system, the determination can, alternatively or additionally, be performed remotely, for example, by a mediator.

It is emphasized that both the loading/unloading target position and the position of the spreader are determined in the same coordinate system. They can both be even detected by the same detector. Similarly, any other positions for loading/unloading, such as the spreader target position, can be determined in the same fixed coordinate system. Using the fixed coordinate system allows measurement errors such as those originating from coordinate conversion and/or from combination of multiple measurements to be mitigated or removed. Moreover, the one or more detectors may be arranged to determine the position of the spreader and/or the loading/unloading target position substantially repeatedly during loading/unloading, e.g. of a single container. The one or more detectors may even be arranged to determine the position of the spreader and the loading/unloading target position continuously during loading/unloading, e.g. of a single container.

The one or more detectors may be arranged to continue measurement at least until the loading/unloading, e.g. of a vehicle, has been completed.

The apparatus can be arranged to cause position control information to be transmitted to the crane for controlling the movement of the spreader towards the spreader target position based on the loading/unloading target position and the position of the spreader to the crane. While the position control information corresponds to the position of the spreader and the loading/unloading target position, it is noted that position control information corresponding to the position of the spreader and position control information corresponding to the loading/unloading target position can be transmitted separately and/or together.

As an example, the apparatus may be arranged to measure the distance to the loading/unloading target position for determining the loading/unloading target position in the fixed coordinate system and cause position control information to be transmitted to the crane for controlling the movement of the spreader towards the spreader target position based on the loading/unloading target position and the position of the spreader to the crane. After the loading/unloading target position has been determined, the apparatus may be arranged to wait for the crane to be positioned for loading/unloading. This means that the crane is positioned so that the spreader can be moved to the spreader target position independently, i.e. while the crane and the trolley remain stationary. After the crane has been positioned for loading/unloading, the apparatus may be arranged to measure the distance to the position of the spreader for determining the position of the spreader in the fixed coordinate system. The latter measurement may now be performed repeatedly and/or continuously to provide feedback for moving the spreader towards the spreader target position.

Optionally, the apparatus may comprise a receiver. The receiver may be arranged, for example to receive crane position information for any parts of the crane including the trolley, the spreader and the gantry of the crane. However, it is noted that the invention specifically allows a simple structure where the apparatus is arranged only to cause position control information to be transmitted.

As a specific example, the apparatus can be arranged to allow automated loading of trucks and/or trains. For this purpose, the crane may be arranged to load and/or unload trucks and/or trains automatically so that human intervention is not necessarily required. In such a case, accurate measurements may markedly improve both the efficiency and safety for loading/unloading.

In an embodiment, the one or more detectors, or even the whole apparatus, is arranged to be positioned in terminal infrastructure. This provides a marked contrast to mounting the detectors to the crane, e.g. to the portal of the crane, since positioning the detectors in terminal infrastructure allows the detectors to be positioned stationarily. Furthermore, since the one or more detectors are mounted on one or more stationary supports, the frame of reference, i.e. the coordinate system, is also stationary, allowing possible measurement errors due to a moving frame of reference to be mitigated or removed. The embodiment thus allows a fixed coordinate system with respect to the terminal to be used for measuring distances. To emphasize, positioning the one or more detectors in terminal infrastructure corresponds to stationary positioning, whereas positioning the one or more detectors in the crane corresponds to positioning, where the apparatus is moved with the crane. A further effect of positioning the detectors in terminal infrastructure is that it allows distances to be measured efficiently and accurately across multiple loading/unloading lanes. For example, the one or more detectors can be arranged to be mounted at an elevated structure, such as a post or a pole, to allow the apparatus to measure distances across multiple loading/unloading lanes.

In an embodiment, determining the loading/unloading target position comprises determining the position of a container on a vehicle and/or the position of one or more twistlocks on a vehicle. This allows the spreader to be positioned for with respect to the container for unloading and/or the twistlocks on a vehicle for loading. In the first case, determining the loading/unloading target position may comprise determining the position of one or more twistlocks on the container. This may allow improving accuracy in positioning and/or coupling the spreader to the one or more twistlocks for picking up the container.

In an embodiment, the loading/unloading target position is determined from a three-dimensional point cloud. This allows the loading/unloading target position to be determined without distinct markers on the loading/unloading target, e.g. markers on the vehicle and/or on the load. This is particularly useful by allowing general containers and/or vehicles for trans-porting containers to be used as long as they comprise shapes that can be identified from the point cloud and used for determining the loading/unloading target position. To determine the loading/unloading target position, for example, the position of one or more twistlocks and/or one or more corners of a container may be determined from the three-dimensional point cloud. Pattern recognition may be used to determine the loading/unloading target position of the three-dimensional point cloud.

In an embodiment, the fixed coordinate system is a block coordinate system corresponding to a single block in a terminal. This allows the whole loading/unloading area where the crane operates to be included in one fixed coordinate system. The terminal can comprise one or more separate blocks, where each block may correspond to one or more loading/unloading areas. Each of the one or more loading/unloading areas may comprise one or more loading/unloading lanes. The use of a block coordinate system allows the whole loading area to be monitored in one fixed reference frame.

In an embodiment, the apparatus is arranged to measure the distance to the position of the spreader when the spreader is moved by the crane into a measurement space having one or more of the following: a target altitude of the spreader, a threshold for maximum altitude of the spreader and a threshold for minimum altitude of the spreader. This allows setting up a measurement space, e.g. a measurement window, so that the accuracy and reliability of the measurement can be markedly improved, for example by calibrating the characteristics of the spreader to be measured and/or calibrating the distance between the measurement space to be small enough that the measurement is actually possible or that it provides an accuracy that is above a threshold accuracy. Correspondingly, the measurement space may be smaller than the field of view of the one or more detectors. The measurement space may also comprise one or more side limits but in practice these may not be necessary since lateral movement of the spreader can be limited by the dimensions of the crane. However, one or more side limits may be used to restrict the measurement space for one or more lanes. The apparatus may be configured so that when the spreader enters the measurement space, measurement of the distance to the position of the spreader is initiated (referred here also as "spreader measurement process"). This allows the entrance of the spreader to the measurement space to act as a trigger for initiating the spreader measurement process. The apparatus may be arranged to detect the entrance of the spreader to the measurement space, for example, through a measurement by the one or more detectors and/or by receiving crane position information. The spreader measurement process can comprise a single measurement and/or a sequence, such as a feedback sequence, of repeated or continuous measurements to determine the position of the spreader. Once the sequence has been initiated, the apparatus may be configured to continue measurement at least until the spreader is moved to the spreader target position or until one or more interruption conditions, such as emergency stop conditions, are met. This allows a well-defined procedure for initiating the process of aligning the spreader with the loading/unloading target position, which in turn may improve the efficiency, reliability and safety of the measurement. The actual determination of the position of the spreader during the spreader measurement process can be performed by the apparatus and/or remotely.

In a further embodiment, the apparatus is arranged to have a field-of-view which simultaneously includes both the measurement space and the loading/unloading target position. This allows the distance to the position of the spreader and the distance to the loading/unloading target position to be measured with one or more detectors without turning the detectors. The one or more detectors may even have fixed orientation. As an example, the apparatus may be arranged to determine the distance to the position of the spreader and the distance to the loading/unloading target position substantially simultaneously.

In an embodiment, the apparatus is arranged to provide position control information for a plurality of loading/unloading lanes at a terminal. This allows a single apparatus to be used for providing the position control information for the plurality of lanes, for example when positioned on the side of an outermost lane of the plurality of lanes. For this purpose, a single detector may be arranged to have a field-of-view over a plurality of loading/unloading lanes at a terminal, even simultaneously.

In an embodiment, the apparatus is arranged to measure, with an additional measurement using the one or more detectors, the distance to the position of the spreader when the spreader is coupled to a container for loading/unloading and the container is positioned at the loading/unloading target position. This allows calibrating the determination for the position of the spreader, which in turn can be used to compensate measurement errors and increase success rates for loading/unloading.

According to a second aspect, a system may be arranged to provide position control information for controlling the movement of a spreader of a crane towards a spreader target position. The system comprises a first apparatus, which may be arranged to be installed in the crane. The first apparatus comprises a receiver, which may be arranged to receive position control information, and a controller, which may be arranged to control the movement of the spreader. The system also comprises a second apparatus, which may be arranged to provide position control information corresponding to the position of the spreader and the loading/unloading target position. The second apparatus may be an apparatus according to the first aspect or any of its embodiments, alone or in combination. The second apparatus comprises one or more detectors, which may be arranged to measure distance, and a transmitter, which may be arranged to cause position control information to be transmitted to the first apparatus. The position control information may be arranged to be transmitted from the second apparatus to the first apparatus directly and/or through one or more mediators. The position control information may be processed, for example by the one or more mediators, between being transmitted from the second apparatus and received at the first apparatus, for example so that the position control information received at the first apparatus comprises information derived from the position of the spreader of a crane and a loading/unloading target position. The information derived may comprise, for example, instructions for moving the spreader to the spreader target position or towards the spreader target position, wherein the instructions are determined based on the position of the spreader and the loading/unloading target position. This way, the second apparatus may be arranged to provide position and/or distance information corresponding to the loading/unloading target position and the position of the spreader, whereas determination of positions based on measured distances and/or determination of the instructions for moving the spreader to the spreader target position or towards the spreader target position may be generated at any combination of the following: the first apparatus, the second apparatus and the one or more mediators. For example, determination of the instructions for moving the spreader to the spreader target position or towards the spreader target position may be generated at the one or more mediators and/or at the first apparatus. This way, the second apparatus can function primarily as a measurement apparatus whereas the crane movements are controlled at the crane or at a separate command unit. As another example, determination of the position of the spreader and/or determination of the loading/unloading target position may be performed at the one or more mediators and/or at the second apparatus.

The one or more detectors of the second apparatus can be arranged to be positioned in the crane and/or in terminal infrastructure. The second apparatus is arranged to measure, using the one or more detectors, both the loading/unloading target position and the position of the spreader in a fixed coordinate system. The second apparatus may be arranged to communicate repeatedly and/or continuously with the first apparatus to provide feedback for moving the spreader towards the spreader target position. Once a feedback sequence has been initiated, the system may be arranged to provide feedback at least until the spreader is moved to the spreader target position or until one or more interruption conditions, such as emergency stop conditions, are met. The first apparatus and/or the one or more mediators may be arranged to provide crane position information to the second apparatus.

In an embodiment, the first apparatus is arranged to direct the spreader into a measurement space for measurement of the distance the position of the spreader. This allows improving the accuracy and reliability of the measurement, for example by calibrating the characteristics of the spreader to be measured and/or calibrating the distance between the measurement space to be small enough that the determination is actually possible or that it provides an accuracy that is above a threshold accuracy. This can be arranged as a specific program instruction, which defines a measurement space, where the spreader is to be moved for measurement. The measurement space is adapted so that the position of the spreader can be determined based on one or more distances measured for the spreader.

In an embodiment, the first apparatus is arranged to slow or stop the movement of the spreader for determination of the position of the spreader. This may allow overcoming limitations in accuracy due to the measurement technology, e.g. the quality of the detectors of the second apparatus, and/or the configuration of the measuring environment, e.g. sub-optimal positioning and/or field-of-view of the detectors with respect to the measurement space.

In an embodiment, the system is arranged, when a container is carried by the spreader, to use position control information corresponding to the position of the spreader to determine, in the fixed coordinate system, an outer boundary of the container. This allows improving safety when moving the container with the spreader as the spatial extent of the container can be monitored by the system when the container is moved. Moreover, the system may be specifically arranged to determine the outer boundary during loading, which may allow improving accuracy and/or speed for positioning the container on a loading platform. The determination can be performed, for example, by the controller and/or one or more mediators. The determination can be performed by a measurement, for example, by the second apparatus but, alternatively or additionally, it can also be performed by calculation. In particular, the system may be arranged to calculate the outer boundary based on one or more known dimensions, such as standard dimensions, of the container. The outer boundary may comprise one or more corners of the container.

In an embodiment, the first apparatus comprises one or more inclination sensors, which may be arranged to measure the inclination of the spreader. This allows reducing the number and/or accuracy of measurements by the second apparatus that are required to determine the spatial extent of the spreader in the fixed coordinate system. For example, it may be enough to determine one point or feature such as a corner or a twist-lock of the spreader by a measurement by the second apparatus, when the system is arranged to determine, for example by the controller, the orientation of the spreader with respect to this one point or feature using the measured inclination of the spreader. The one or more inclination sensors may be arranged to measure the inclination of the spreaders with respect to one or more axes of the spreader, for example with respect to two or three axes.

In an embodiment, the determination of the position of the spreader is calibrated using a measured distance to the position of the spreader when the spreader is coupled to a container for loading/unloading and the container is positioned at the loading/unloading target position. The calibration may be performed by the system, for example, by using any combination of the first apparatus, the second apparatus and one or more separate processors.

According to a third aspect, a method of providing position control information can be used to control the movement of a spreader of a crane towards a spreader target position. The method comprises measuring both the distance to a loading/unloading target position and the distance to a position of the spreader. Specifically, the measurement is performed so that it allows determining both the loading/unloading target position and the position of the spreader in a fixed coordinate system. For this purpose, an apparatus according to the first aspect or any of its embodiments, alone or in combination, may be used. The measurement may be performed from the crane and/or terminal infrastructure, for example by the apparatus comprising one or more detectors positioned in the crane and/or stationarily in terminal infrastructure. The method further comprises causing position control information to be transmitted to the crane, where the position control information corresponds to the position of the spreader and the loading/unloading target position so that it can be used to control the movement of the spreader towards the spreader target position based on the loading/unloading target position and the position of the spreader to the crane.

The position control information may be transmitted to the crane directly and/or through one or more mediators. The position control information corresponding to the loading/unloading target position can be transmitted together and/or separately with the position control information corresponding to the position of the spreader. The method can be used in the system according to the second aspect or any of its embodiments, alone or in combination. For example, position control information may be received in the crane by an apparatus, which may be a first apparatus according to the second aspect or any of its embodiments, alone or in combination. Position control information may be modified during transmission so that, for example, position control information transmitted from an apparatus, such as the apparatus according the first aspect, may comprise the position of the spreader of a crane and a loading/unloading target position both determined by the apparatus, whereas position control information received at the crane may comprise information derived from the position of the spreader of a crane and the loading/unloading target position.

After the position control information corresponding to the loading/unloading target position has been determined, this information can be used to position the crane for loading/unloading. This means that the crane can be moved to a position so that the spreader can be independently moved to the spreader target position. After the crane has been positioned for loading/unloading, the spreader can be moved towards the loading/unloading target position, for example by lowering the altitude of the spreader. This loading/unloading process allows the spreader to be safely moved to a measurement space to avoid collisions. Before the crane is positioned for loading and/unloading, the spreader can therefore be lifted up and lowered only after the loading/unloading target position has been determined and the crane has been positioned for loading/unloading.

The apparatus according to first aspect and/or the system according to the second aspect may be specifically configured for any or all parts of the method according to the third aspect. For example, the apparatus may be configured to measure the distance to the loading/unloading target position before the crane has been positioned for loading/unloading and measure the distance to the position of the spreader after the crane has been positioned for loading/unloading, for example when the spreader has been moved, in particular lowered, to a measurement space. As another example, the system may be specifically arranged to position the crane for loading/unloading after it has determined the loading/unloading target position. After this, the system may further be arranged to move, in particular lower, the spreader towards the loading/unloading target position, for example to a measurement space, so that the position of the spreader may be determined for directing the spreader to the spreader target position when the spreader is independently moved.

In an embodiment, the method comprises measuring, with an additional measurement, the distance to the position of the spreader when the spreader is coupled to a container for loading/unloading and the container is positioned at the loading/unloading target position.

The determination for the position of the spreader may then be calibrated, for example by compensating a measured distance to the position of the spreader by a compensation distance and/or determining the position of the spreader by using a compensating shift of the position.

According to a fourth aspect, a computer program product comprises computer executable code which, when executed on a computer, is configured to at least execute the method according to the third aspect and/or any of its embodiments, alone or in combination. For this purpose, the computer program product may be configured to utilize the apparatus according to the first aspect and/or any of its embodiments, alone or in combination, i.e. to cause the apparatus to execute the method. The computer program product may be stored on at least one memory comprising computer program code, the at least one memory and the computer program code configured to cause the apparatus to at least execute the method.

To summarize one of the main effects of the invention, the invention allows using only one measurement system during loading/unloading. This allows the invention to be used with only one measurement system needing to be calibrated. The same measurement system can be used to determine both the loading/unloading target position and the position of the spreader and/or the load, so the number of sources for potential measurement errors may be reduced, e.g. to only one source of measurement error due to only one measurement system being calibrated. Consequently, measurement accuracy may be improved and/or simpler measurement equipment may be used to obtain the same measurement accuracy. In particular, the invention can be used for improved loading/unloading with measurements performed from the terminal infrastructure.

It is to be understood that the aspects and embodiments described above may be used in any combination with each other. Several of the aspects and embodiments may be combined together to form a further embodiment.

BRIEF DESCRIPTION OF THE DRAWINGS

The accompanying drawings, which are included to provide a further understanding and constitute a part of this specification, illustrate embodiments and together with the description help to explain the principles of the invention. In the drawings.

Like references are used to designate equivalent or at least functionally equivalent parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

Figure 1:
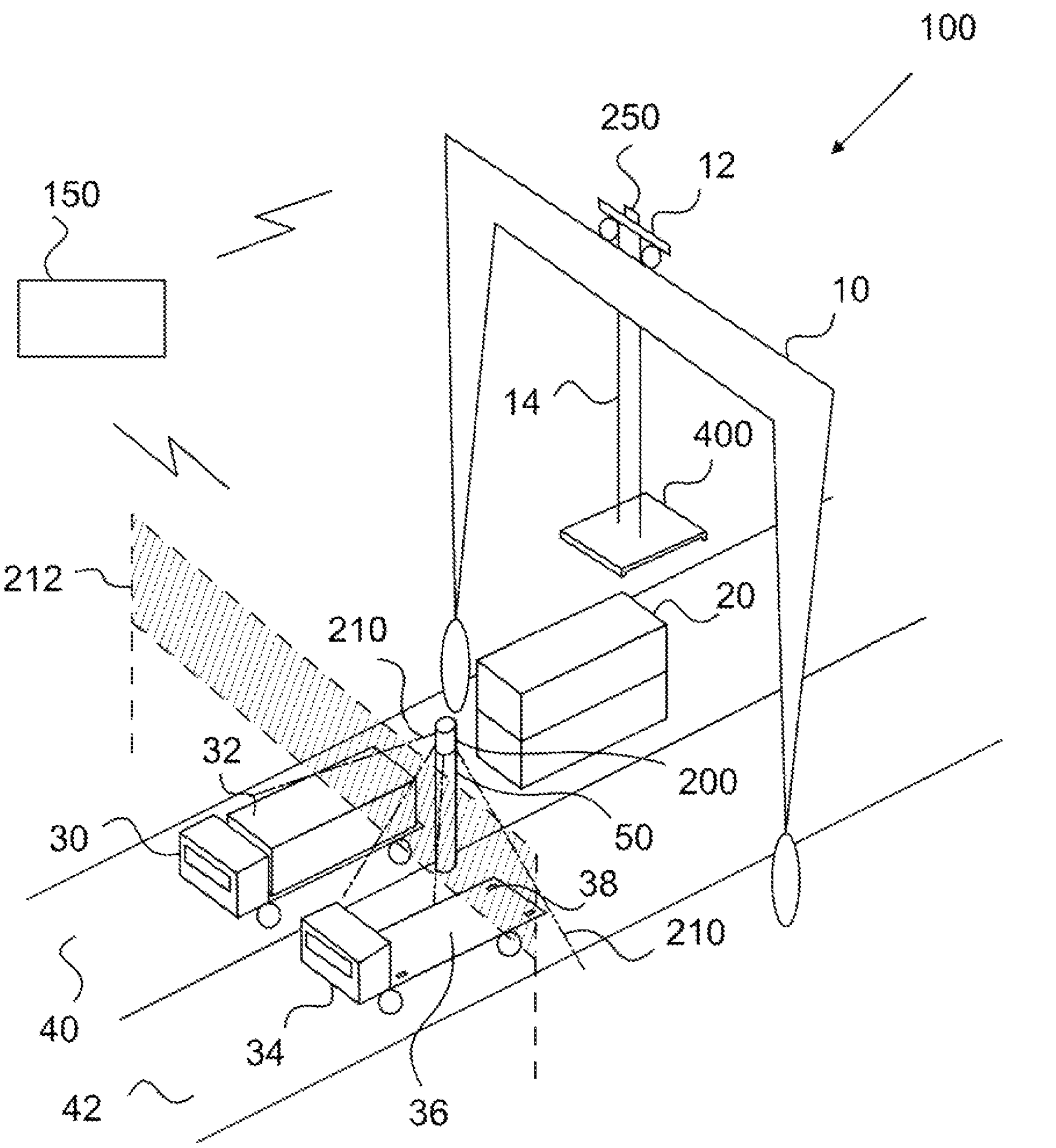
FIG. 1 schematically illustrates a system according to an embodiment in a perspective view.

FIG. 1 schematically shows a system 100 for providing position control information for controlling the movement of a spreader 400 of a crane 10 towards a spreader target position. The system 100 may be arranged to be used in a terminal such as a container freight terminal, for example at a port. The terminal may comprise at least one block with a loading/unloading area. The loading/unloading area may comprise one or more loading/unloading lanes 40, 42 (referred here also as "lanes"). The lanes 40, 42 may be arranged as traffic lanes for vehicles 30, 34 such as trucks and/or trains. The lanes 40, 42 may be parallel with respect to each other. The lanes 40, 42 are arranged so that vehicles 30, 34, may drive through them and stop for loading/ unloading by one or more cranes 10. A vehicle 36, 38 may comprise one or more twistlocks 38 for fixing the load 20 to the vehicle 30, 34. As an example, one crane 10 may be arranged to handle loading/unloading in one loading/unloading area. The loading/unloading area may comprise a designated area for the load 20. The terminal comprises terminal infrastructure 50 such as buildings and fixed structures.

A crane 10 is arranged to move in the loading/unloading area for loading/unloading the load 20 to and/or from one or more vehicles 30, 34. The crane 10 may comprise a bridge and/or a gantry. The crane 10 may comprise a trolley 12 which may be arranged to move along the bridge. The crane 10 comprises a spreader 400 for moving the load 20. Typically, the spreader 400 is arranged to hang from ropes and/or cables 14, which may be adjusted to alter the altitude of the spreader 400. Optionally, the spreader 400 may be connected to a headblock 510. This allows the spreader 400 to be exchanged with a new one, if necessary, without detaching the ropes and/or cables 14. The spreader 400 may be coupled to a trolley 12 for moving the spreader 400 laterally. The coupling may be also indirect, for example when the spreader 400 is connected to a headblock 510 which, in turn, is coupled to a trolley 400. The coupling is arranged to allow the spreader 400 to be moved vertically, for example by ropes and/or cables 14. The spreader 400 can be arranged to be moved horizontally by moving the crane horizontally, for example so that the whole bridge and/or gantry moves horizontally.

The system 100 comprises a first apparatus 250, which may be installed in the crane 10. The first apparatus 250 is arranged to receive position control information and use the position control information to control the movement of the spreader 400 towards the spreader target position. As an example, the first apparatus 250 may be arranged to be installed at the trolley 12 but it may also be installed in other parts of the crane 10. The first apparatus 250 may also be implemented as a distributed system with some components installed separately from other components.

The system 100 comprises a second apparatus 200 for providing position control information corresponding to the position of a spreader 400 of a crane 10 and a loading/unloading target position 32, 36. The loading/unloading target position 32, 36 may be on a vehicle 30, 34, e.g. on its trailer. The loading/unloading target position 32, 36 can be used to determine a spreader target position for loading/unloading. The spreader target position is therefore typically slightly above the loading/unloading target position, the distance being determined based on the height of the load. The system 100 or the second apparatus 200 may be arranged to provide position control information corresponding to a position of the spreader 400 and the loading/unloading target position 32, 36 for loads 20 of varying sizes. For example, the system 100 may be arranged to receive and/or determine, for example by measurement, the height of the load 20 for determining the spreader target position based on the loading/unloading target position 32, 36 and the height of the load 20. Also, the second apparatus 200 may be arranged to simultaneously observe the position of the spreader 400 and the loading/unloading target position 32, 36 for providing position control information even when the height of the load 20 is not fixed. During unloading, the loading/unloading target position 32 can be a position of the load 20, for example a position of a container. This position 32 may be determined based on one or more features of the load 20 such as one or more twistlocks of a container and/or one or more corners of a container 20. During loading, the loading/unloading target position 36 can be a position of a loading platform, for example the position of a loading platform, such as a trailer, of a vehicle 30, 34. This position 36 may be determined based on one or more features of the loading platform such as one or more twistlocks 38 of a vehicle 30, 34 and/or one or more corners of a vehicle 30, 34.

The second apparatus 200 has a field of view 210 for providing position control information corresponding to the position of a spreader 400 of a crane 10 and a loading/unloading target position 32, 36. The field-of-view 210 may extend across one or more lanes 40, 42. The field-of-view 210 may be fixed. The field of view 210 may be continuous or it may be arranged to extend discontinuously across two or more lanes 40, 42, which may be adjacent. The second apparatus 200 may be arranged to be positioned between two lanes 40, 42. The second apparatus 200 can thereby be arranged to provide position control information for these two lanes 40, 42. The second apparatus 200 may even be arranged to use a single detector 222 for providing position control information for these two lanes 40, 42. Also, this allows reducing distance between the second apparatus 200 and the loading/unloading target position 32, 36 allowing the second apparatus 200 to be configured for reduced distance measurement, improving accuracy.

A measurement space 212 may be used to initiate some or all parts of the process of providing position control information corresponding to the position of a spreader 400 of a crane 10, in particular the measurement process where the distance to the position of the spreader 400 is measured for determining the position of the spreader 400 (referred here also as "spreader measurement process"). The loading/unloading target position 32, 36 may be determined simultaneously and/or separately, for example before initiating the spreader measurement process. The spreader measurement process may, however, also comprise determining the loading/unloading target position 32, 36 one or more times. The crane 10 may be arranged to move the load and/or the spreader 400 to the measurement space 212 to initiate the spreader measurement process, for example when the second apparatus 200 detects the load and/or the spreader 400 in the measurement space 212. The measurement space 212 may be fixed and its coordinates in the block coordinate system can be used by the system 100, for example by the first apparatus 250 and/or the second apparatus 200. This allows, for example, the crane 10 to automatically move the spreader 400 and/or the load 20 to the measurement space 212. One or more lanes 40, 42 may be associated with their own measurement space 212 to allow the spreader 400 and/or the load 20 to be moved to the measurement space 212 of the lane 40, 42 automatically. The measurement space 212 may be located above the location where a vehicle 30, 34 is to be stopped for loading/unloading but it may also be located on the side of that location. The movement of the spreader 400 in the measurement space 212 may be slowed down or stopped to allow detection of the spreader 400 by the second apparatus 200. The measurement space 212 may be one, two or three dimensional space. For example, the measurement space 212 may comprise one or more of the following: a target measurement position for the spreader, a target altitude of the spreader, a threshold for maximum altitude of the spreader and a threshold for minimum altitude of the spreader. Alternatively or additionally, the measurement space 212 may comprise a two- or three-dimensional measurement window for the spreader 400. The system 100 and/or the second apparatus 200 may be arranged to continue the spreader measurement process, with repeated and/or continuous measurement, once it has been initiated. This way, the measurements provided by the second apparatus 200 can be used for providing feedback to the first apparatus 250 controlling the movement of the spreader 400. The spreader 400 may be lowered to the measurement space 212 from above. This allows the spreader 400 to safely approach the vehicle 30, 34.

The position control information provided by the second apparatus 250 can be transmitted to the first apparatus 200 directly. Alternatively or in addition, the system 100 may comprise one or more mediators 150 such as communication equipment and/or computing servers through which the position control information can be transmitted. For example, the system 100 may comprise one or more monitoring centers located inside or outside the terminal for this purpose. The one or more mediators 150 may comprise one or more computing servers, which may be arranged to monitor and/or control one or more cranes 10. The one or more mediators 150 may be arranged for automated loading/unloading with the crane 10. The one or more mediators 150 may be arranged to perform some or all of the processing for determining control instructions for moving the spreader 400 to the spreader target position. However, any combination of the mediator system 100, first apparatus 250 or second apparatus 200 can be arranged to determine the spreader target position based on the loading/unloading target position 32, 36 determined by the second apparatus 200. Moreover, any combination of the mediator system 100, first apparatus 250 or second apparatus 200 can be arranged to determine instructions for moving the spreader 400 to the spreader target position or towards the spreader target position, based on the loading/unloading target position 32, 36 and the position of the spreader 400 determined by the second apparatus 200.

Figure 2:
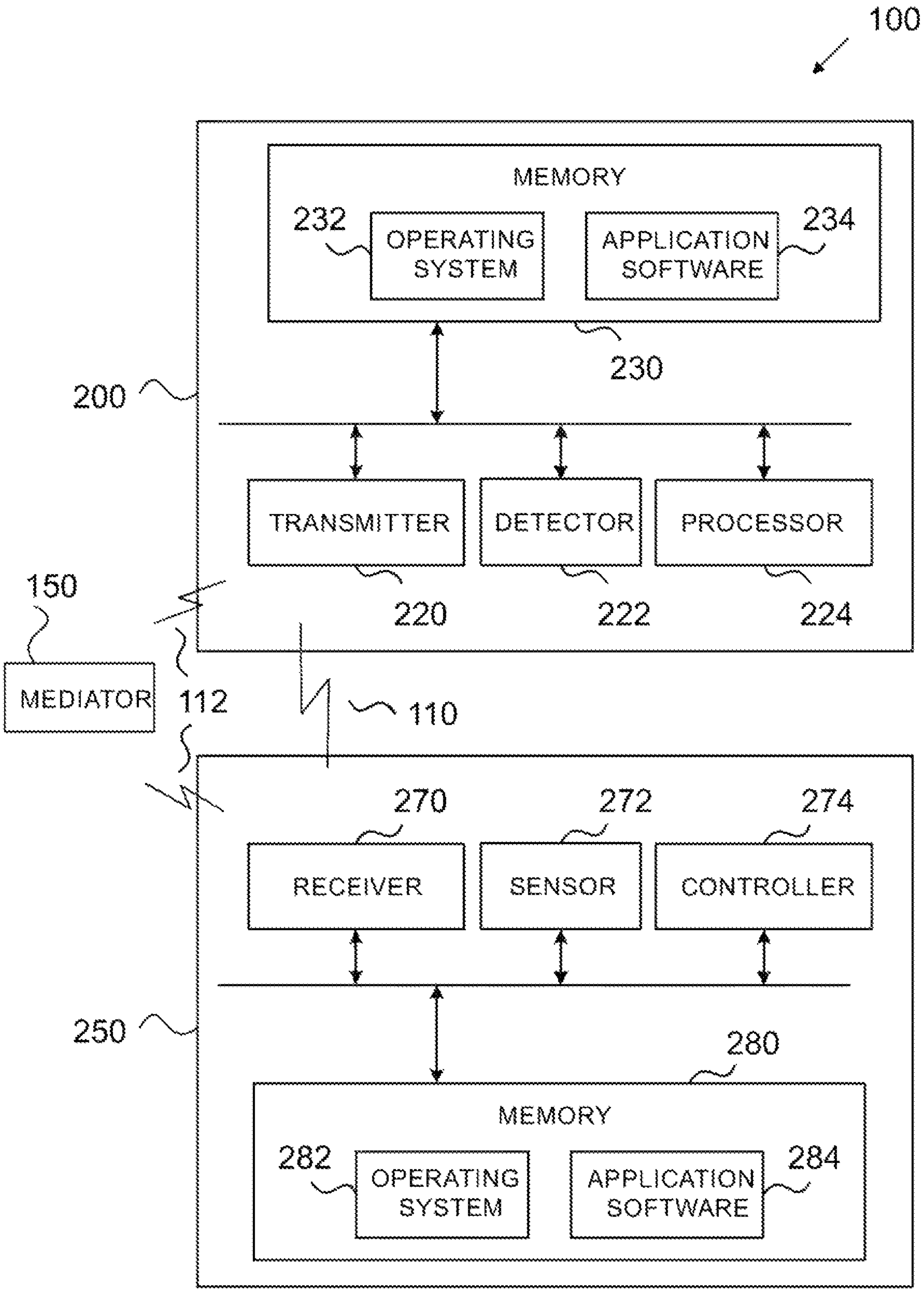
FIG. 2 illustrates a block diagram of a system according to an embodiment.

FIG. 2 illustrates a block diagram of a system 100 according to an embodiment. The system 100 comprises a first apparatus 250 and a second apparatus 200. The system 100 may also comprise one or more mediators 150.

The first apparatus 250 comprises a receiver 270 for receiving position control information, which receiver 270 can also be a transmitter-receiver. The receiver 270 can be arranged for wireless or wired transfer of information. The first apparatus 250 also comprises a controller for controlling the movement of the spreader 400. The first apparatus 250 may also comprise one or more sensors 272. The one or more sensors 272 may be arranged, for example for determining the position and/or orientation of the spreader 400. In particular, the one or more sensors may comprise one or more inclination sensors for determining the inclination of the spreader 400 and/or the headblock 510. The one or more inclination sensors may be arranged to be installed in the spreader 400 and/or the headblock 510. The inclination may be determined with respect to one or more axes. Alternatively or additively, the one or more sensors 272 may be arranged to determine the position and/or orientation of the crane 10, for example that of the gantry and/or the bridge. The first apparatus 250 may further comprise a memory 280, which may comprise program instructions for controlling the operation of the crane 10, e.g. the movement of the spreader 400. For example, an operating system 282 and/or application software 284 for operating the crane 10 can be stored in the memory 280.

The second apparatus 200 comprises a transmitter 220 for transmitting position control information, which transmitter 220 can also be a transmitter-receiver. The transmitter 220 can be arranged for wireless or wired transfer of information.

The second apparatus 200 also comprises one or more detectors 222 for measuring distance. The one or more detectors 222 may comprise a two- or three-dimensional laser scanner. Alternatively or additionally, the one or more detectors 222 may comprise, for example, one or more optical detectors and/or pattern recognition devices. The one or more detectors 222 are arranged so that they can be used by the apparatus 200 to measure the distance to the loading/unloading target position 32, 36 for determining the loading/unloading target position 32, 36 in a fixed coordinate system. The one or more detectors 222 are also arranged so that they can be used by the apparatus 200 to measure the distance to the position of the spreader 400 in the fixed coordinate system for determining the position of the spreader 400 in a fixed coordinate system. In either or both cases, measuring the distance may actually comprise multiple measurements and/or multiple different distances measured with respect to different points of the target to be measured. At least one detector 222, such as a laser scanner, can be arranged for determination of both the loading/unloading target position 32, 36 and the position of the spreader 400 in a fixed coordinate system. The detector 222 may be arranged to do this with fixed orientation.

The one or more detectors 222 can be arranged to be installed in the crane 10 and/or in terminal infrastructure. The one or more detectors 222 can be installed at an elevated position to extend the field of view 210 across the one or more lanes 40, 42, even across all the lanes 40, 42 of the loading/unloading area. For example, the one or more detectors 222 may be arranged to be installed at an elevation of 4-5 meters or more, for example at an elevation of 6-8 meters or even more. As an example of installation in the crane 10, some or all of the one or more detectors 222 can be arranged to be installed at one or both sides of the crane 10, e.g. at a vertical leg of the crane 10 or the gantry of the crane 10. As an example of installation in terminal infrastructure, some or all of the one or more detectors 222 can be arranged to be installed at a post or a pole but also atop a building or some other elevated structure. In terminal infrastructure, the one or more detectors 222 may be arranged to be installed in a stationary position. The field-of-view 210 of the second apparatus 200 can be covered with one detector 222 and/or with multiple detectors 222. For example, at least one 222 may be arranged to monitor one or more lanes 40, 42, even all the lanes of a loading/unloading area for providing position control information. Conversely, when the loading/unloading area has multiple lanes 40, 42, one or more lanes 40, 42, even all the lanes, may have a separate detector 222 arranged to monitor the lane for providing position control information. The one or more detectors 222 may be arranged to face downwards and/or substantially horizontally. For example, the one or more detectors 222 may be arranged so that their field-of-view 210 extends at most 0-10 degrees above the horizontal level. The one or more detectors 222 may be arranged to be positioned on the altitude of the measure space 212 and/or above it. For example, the one or more detectors 222 may be arranged to be positioned on the altitude of the measurement space 212 or at most 1-2 meters above the measurement space 212.

The second apparatus 200 may comprise a processor 224. The processor 224 may be arranged to process the position control information before it is transmitted by the transmitter 220 of the second apparatus 200. For example, the processor 224 may be arranged to determine the loading/unloading target position 32, 36 based on the measured distance to the loading/unloading target position 32, 36. Alternatively or additionally, the processor 224 may be arranged to determine the position of the spreader 400 based on the measured distance to the position of the spreader 400 400. As one further example, the processor 224 may be arranged to determine the spreader target position based on the position of the spreader and the loading/unloading target position 32, 36 determined by the apparatus 200. The second apparatus 250 may further comprise a memory 230, which may comprise program instructions for controlling the operation of the second apparatus 200. For example, an operating system 232 and/or application software 234 for operating the crane 10 can be stored in the memory 230.

The first apparatus 250 and the second apparatus 200 may be arranged to communicate directly 110 and/or indirectly 112 through one or more mediators 150. The first apparatus 250 and the second apparatus 200 may be arranged to communicate only in one direction so that position control information is transmitted from the second apparatus 200 to the first apparatus 250.

However, it is also possible for the second apparatus 200 to be arranged to receive information such as crane position information, for example from the first apparatus 250 and/or the mediator 150. Correspondingly, the first apparatus 250 may also comprise a transmitter and, alternatively or additionally, the second apparatus 200 may also comprise a receiver.

Figure 3:
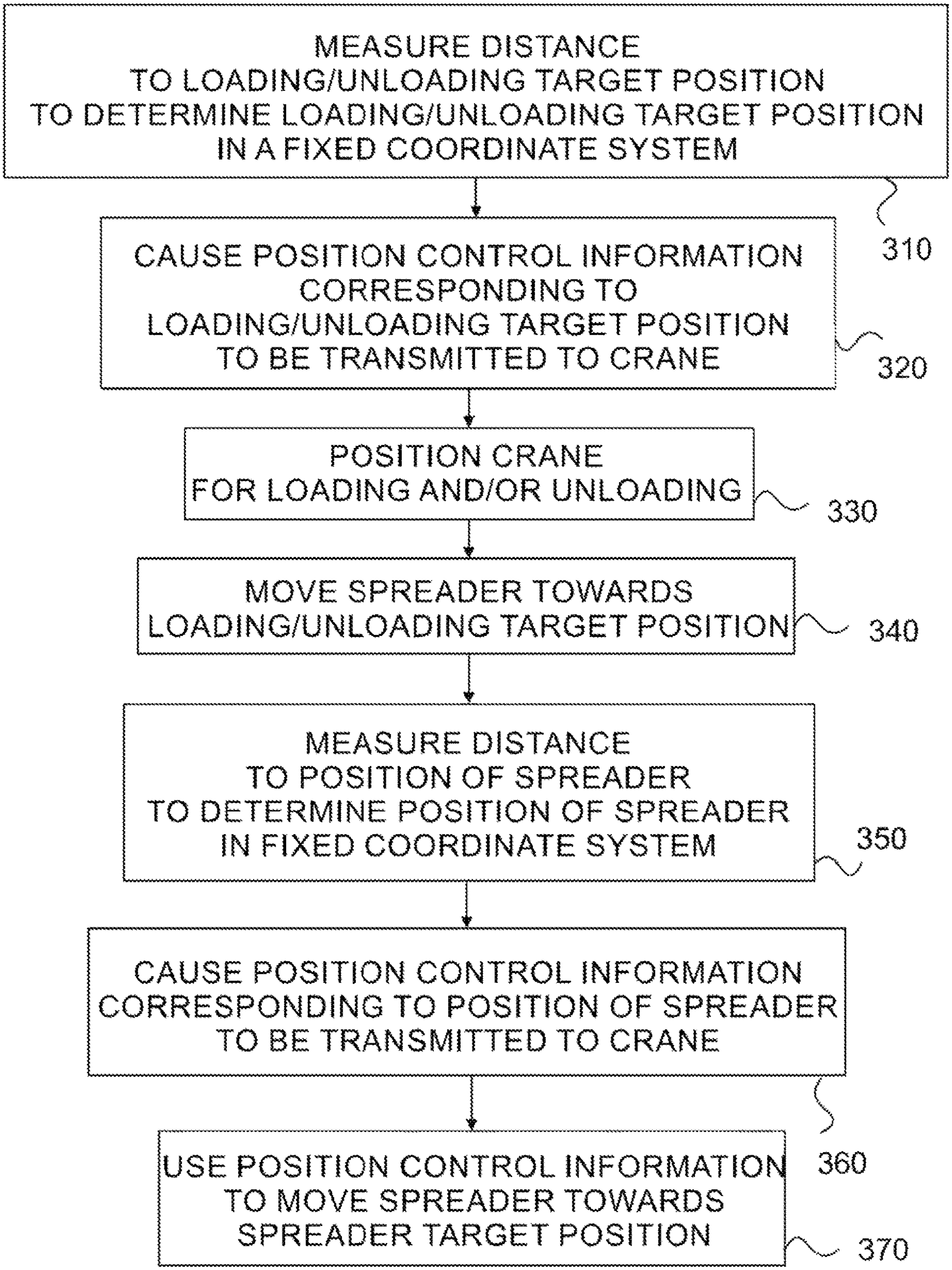
FIG. 3 illustrates a flow diagram of a method according to an embodiment.

FIG. 3 illustrates a flow diagram of a method according to an embodiment. The method comprises measuring 310, for example by an apparatus such as the second apparatus 200, the distance to the loading/unloading target position 32, 36 for determining the loading/unloading target position 32, 36 in a fixed coordinate system. Based on the determined loading/unloading target position 32, 36 the crane 10 can be positioned 330 for loading/unloading, for example by the system 100 or, specifically, by an apparatus such as the first apparatus 100. This may involve moving the gantry and/or trolley 12 of the crane 10 in position. The alignment process may be arranged so that after positioning 330 of the crane 10, the spreader 400 is above the loading/unloading target position 32, 36.

The method also comprises measuring 350, by the same apparatus as in the measurement for the loading/unloading target position 32, 36, the distance to the position of the spreader 400 for determining the position of the spreader 400 in the same fixed coordinate system. The loading/unloading target position 32, 36 may be determined before the position of the spreader 400 is measured 350. This allows the presence and location of the target, e.g. a vehicle 30, 34 and/or a load 20, to be determined before the spreader 400, which may have a load 20 coupled to it, is moved 340 close to the area where the loading/unloading is to take place. For measuring 350 the position of the spreader 400, the spreader 400 is moved 340, e.g. lowered, towards the loading/unloading target position 32, 36. At this point the loading/unloading target position 32, 36 may have been already determined 310 but it need not necessarily have been, since the position where the loading/unloading takes place is typically known and therefore a coarse approximate of the loading/unloading target position 32, 36 can be used at least in some situations. When the spreader 400 is in the field-of-view 210 of the apparatus 200, its position can be measure 350 by the apparatus 200. For this purpose the spreader 400 can be moved, e.g. lowered, to a measurement space 212. When the spreader 400 is in the measurement space 212 or approaches the measurement space 212, its movement may be slowed down or stopped for measurement of its position 400. The position of the spreader 400 and/or the loading/unloading target position 32, 36 can be determined repeatedly. Alternatively or additionally, either or both of them, in particular the position of the spreader 400, can even be determined continuously. This way, the apparatus 200 can be arranged to provide feedback for moving the spreader 400 towards the spreader target position.

To provide the position control information for moving 370 the spreader 400 towards the spreader target position, the method comprises causing 320, 360 position control information corresponding to the loading/unloading target position 32, 36 and the position of the spreader 400 to be transmitted to a crane 10.

The position control information can be transmitted to the crane 10 repeatedly or continuously, for example at least until the spreader 400 is positioned at the spreader target position. The position control information can be transmitted by an apparatus such as the second apparatus 200 and it can be transmitted to the crane 10 either directly from the apparatus or indirectly through one or more mediators 150. Position control information corresponding to the position of the spreader 400 and position control information corresponding to the loading/unloading target position 32, 36 may be transmitted simultaneously or separately.

By using position control information corresponding to both the loading/unloading target position 32, 36 and the position of the spreader 400, the spreader can be moved 370 towards the spreader target position. The whole process including measuring 310, 350 the loading/unloading target position 32, 36 and the position of the spreader 400, causing 320, 360 position control information to be transmitted to the crane 10 and using 370 position control information to move the spreader 400 towards the spreader target position can be arranged to be performed in an automated sequence. The automated sequence may continue at least until the spreader 400 has been moved to the spreader target position or until one or more interruption conditions, such as emergency stop conditions has been met. Each of the system 100, the first apparatus 250 and the second apparatus 200, may be arranged to cause the automated sequence to be performed.

After the loading/unloading target position 32, 36 has been determined and the crane 10 has been moved into position for loading/unloading, the spreader 400 can potentially be moved to the spreader target position by spreader movements only, for example using only so-called spreader micromovements. For this purpose, the spreader 400, including parts of the spreader arranged to hold the load, may be arranged to be able to move laterally while the trolley 12 remains stationary. This means that no movement of the crane 10 or the trolley 12 is necessary to move the spreader 400. In one example, the spreader 400 may be arranged for maximal lateral movement of 400-600 millimeters in one or more dimensions, i.e. the maximal lateral movement being+/−200-300 from a center point. With advances of technology, it should be understood that the maximal lateral movement may also be higher. When the spreader 400 is connected to a headblock 510, either or both the spreader 400 and the headblock 510 may be arranged to facilitate the movements of the spreader to allow the spreader 400 to be moved independently, i.e. with the trolley 400 and the crane 10 remaining stationary. Correspondingly, the spreader measurement process described above can be adapted for positioning of the spreader 400 so that only spreader movements are required.

As one example, a system for providing position control information for controlling the movement of a spreader of a crane towards a spreader target position can be implemented as a Truck Lane Measurement System (TLMS). The system comprises at least one detector, which can be installed in terminal infrastructure. At first, the system is used to determine a position of a container on a vehicle, e.g. on a trailer, or a loading target position for placing a container on a vehicle, e.g. on a trailer. The system can also be used to measure reference objects installed in the spreader and/or a headblock of the crane, and to determine the spreader position while lowering the spreader or the container. While the spreader is lowered towards the vehicle, the system can provide feedback for the crane, indicating how the spreader must be controlled in order to get the spreader close to the container on the vehicle or the spreader target position for releasing the container on the vehicle.

The measurement procedure may comprise some or all of the following steps. First, the vehicle can be measured with one or more detectors of the system to get sufficient amount of measurement data to create a 3D point cloud of vehicle shapes, which may including twistlocks, and/or one or more containers on the vehicle. Second, the measurement data can be processed by the system to detect the positions of container edges and/or target twistlocks in order to determine the container position or a loading target position on the vehicle. Third, the crane's gantry and/or trolley can be driven to the assumed target position. Fourth, the spreader can be lowered to a safe height where the detector of the system is able to detect the spreader, e.g. from reference objects in the spreader and/or headblock. Fifth, the spreader speed may be lowered in order to get sufficient amount of measurement data for the system to determine the spreader position. Sixth, the system can use the position of the spreader to calculate the spreader movements needed in order to control the spreader towards the target. Seventh, while lowering the spreader, feedback of the system can be used to control the spreader.

Figure 4:
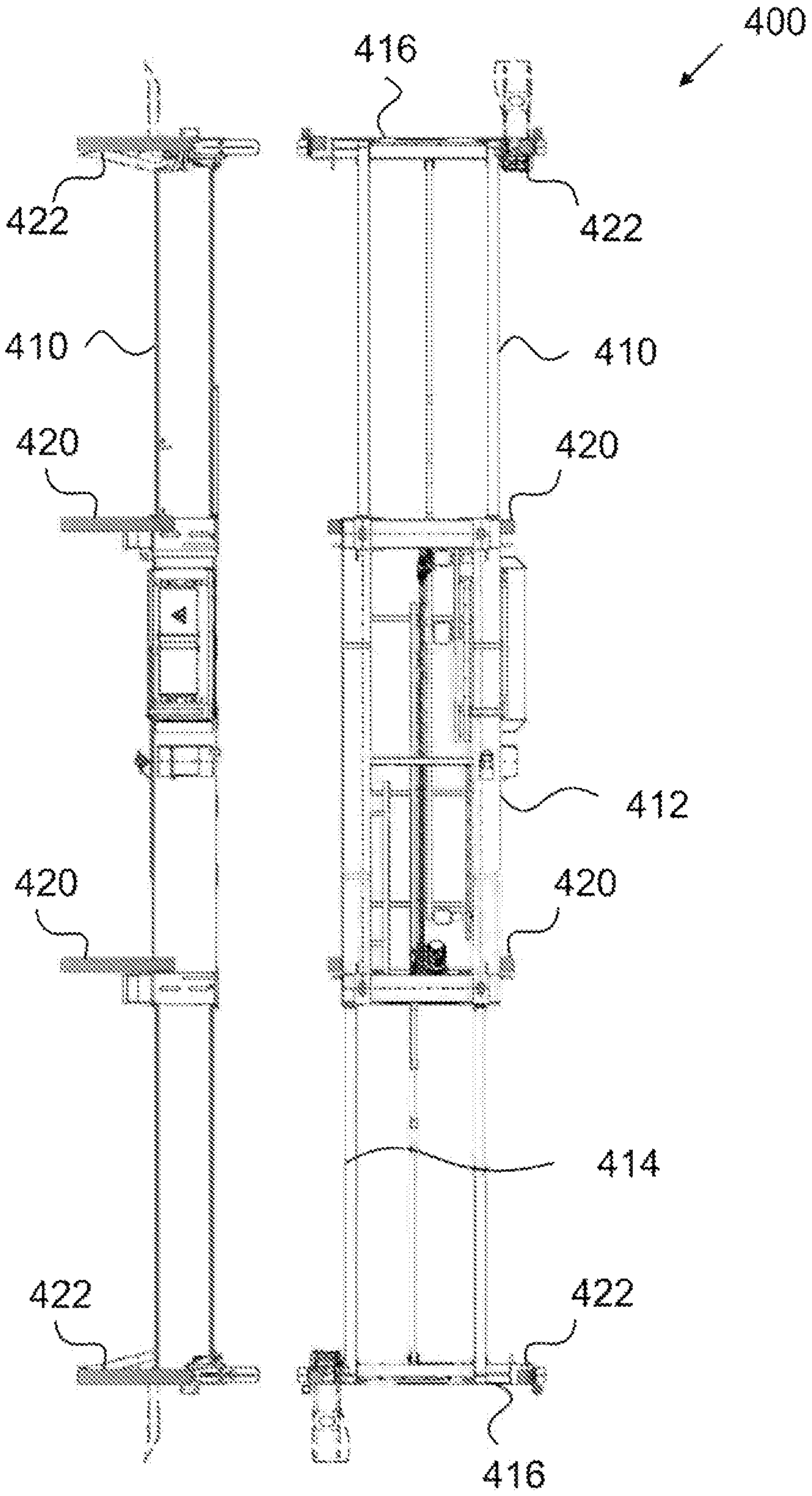
FIG. 4 illustrates a spreader according to an embodiment in a side view (left) and an overhead view (right)

FIG. 4 illustrates a spreader 400 according to an embodiment in a side view (left) and an overhead view (right). The spreader 400 comprises a body 410, which may comprise one or more horizontally extending beams for carrying a load 20. The spreader 400 may comprise one or more markers 420, 422, which may be used as reference features for determining the position of the spreader 400. As an example, the spreader 400 may comprise one or more markers 420, 422 at its front edge 412 and/or one or more markers at its rear edge 414. Similarly, to improve detection, the spreader 400 may comprise one or more markers 422 at each of its side edges 416. The one or more markers 420, 422 may be arranged to be identifiable by the second apparatus 200, for example by their color and/or shape. Conversely, the second apparatus 200 may be arranged to identify the one or more markers 420, 422 for determining the position of the spreader 400.

Figure 5:
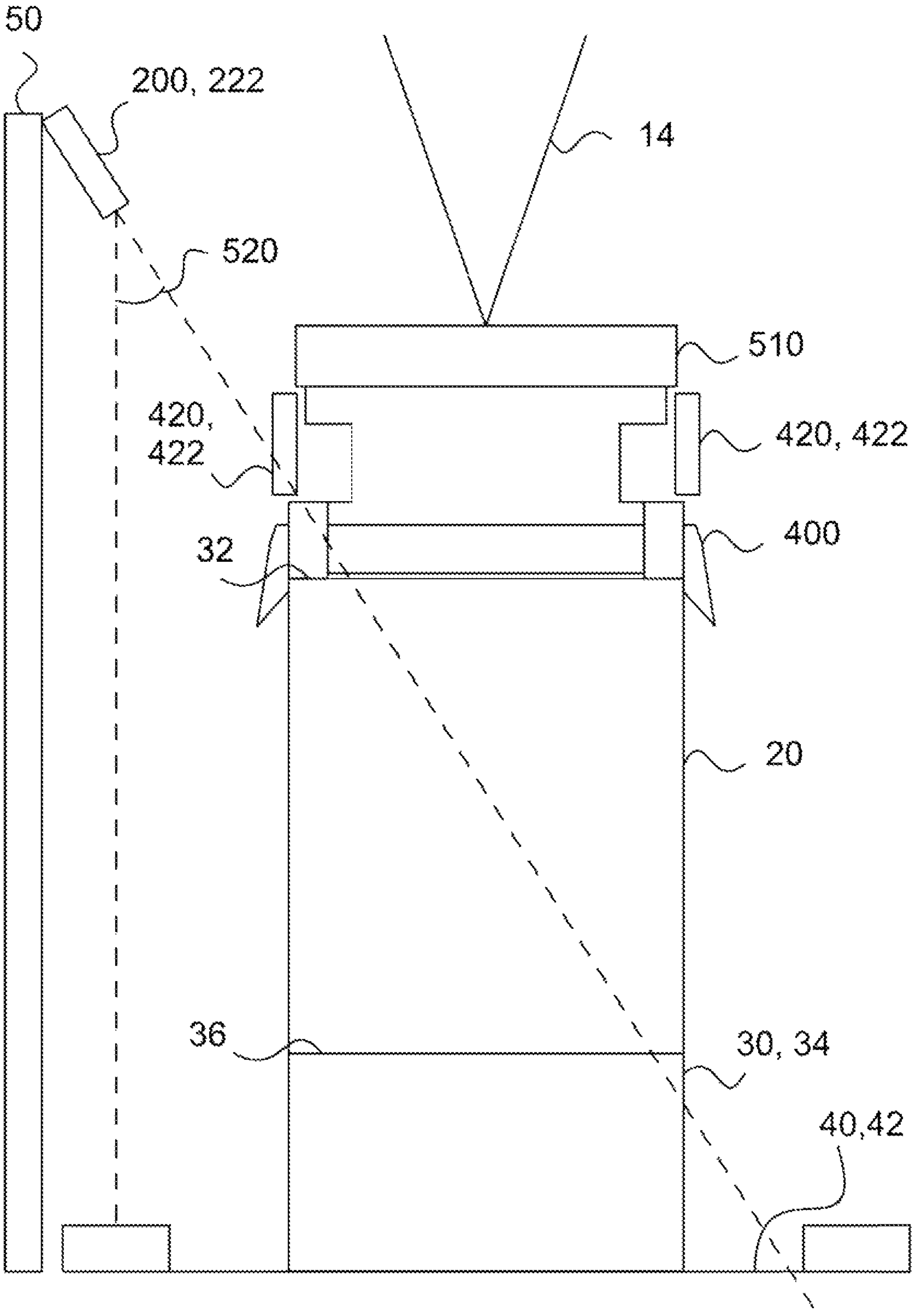
FIG. 5 illustrates providing position control information according to an embodiment.

FIG. 5 illustrates providing position control information according to an embodiment. While various features described above are illustrated in the FIG. with corresponding reference numbers, these features are optional unless otherwise stated.

Importantly, it has been found that position control for the spreader 400 can be markedly improved by calibrating the determination for the distance to the position of the spreader 400 by using an additional measurement for the distance to the position of the spreader 400 during a crane ground job, i.e. when the spreader 400 is coupled to a load 20, such as a container, for loading/unloading and the load 20 is positioned at the loading/unloading target position 32, 36. The additional measurement can be used as a calibration measurement. The additional measurement and/or the determination may be performed automatically. The additional measurement may be performed once it has been determined that the spreader 400 is coupled to the load 20 for loading/unloading and that the load 20 is at the loading/unloading target position, for example at rest on a vehicle 30, 34 and/or a loading/unloading platform. This determination may be performed partially or fully automatically, for example by the second apparatus 200 and/or by one or more parts of the system 100. The additional measurement and/or the determination may be performed repeatedly, for example once or more during for each ground job.

The additional measurement and/or the determination may be performed, for example, once the load 20 has been successfully positioned at the loading/unloading target position 32, 36.

Since the load 20 is on the loading/unloading target position 32, 36, the position of the spreader 400 determined from the additional measurement (hereafter also "spreader reference position") should ideally correspond to the position of the spreader 400 determined from the measurement for the distance to the loading/unloading target position (hereafter also "load-based spreader position"). Here, the load-based spreader position may be determined based on the loading/unloading target position 32, 36 and the height of the load 20. However, since the measurement for the distance to the position of the spreader 400 and the measurement for the distance to the loading/unloading target position 32, 36 are different measurements, measurement bias typically arises. This bias can now be determined and compensated for a following loading/unloading operation. In short, a difference between the spreader reference position and the load-based spreader position can be determined and the difference may be used for compensating any following determination for the position of the spreader 400. For example, the difference may be partially or fully added into any determined position of the spreader 400. The difference in position may be determined for one or more variables such as the one or more horizontal position components and/or skew. One or more previous differences may be used for determining a compensated position of the spreader 400. For example, an average of two or more previous difference may be determined and used for compensation. Using a bias memory comprising at least one previous difference whose validity has been confirmed and/or two or more previous differences may be used to improve the robustness of bias determination with respect to temporary malfunction and/or sporadic errors in measurements.

The system 100 and/or the second apparatus 200 may be arranged to determine whether calibration can be performed. In particular, it has been found that the ability of the system 100 to detect the spreader 400 may be improved by increasing the detector angle 520 for the one or more detectors 222 with respect to vertical direction. The detector angle 520 may be defined, for example, as corresponding to the angle between the vertical direction and the viewing direction, or a limit thereof, of the one or more detectors 222. A minimum detector angle may be used as a threshold for performing the calibration. The system 100 and/or the second apparatus 200 may be arranged to determine whether the detector angle 520 is equal or larger than a threshold angle. The additional measurement and/or the calibration can be conditional on the detector angle 520 being equal or larger than a threshold angle. The detector angle 520 may depend on any combination of the height at which the one or more detectors 222 are mounted, the height of the load 20, the height of the loading/unloading target position 32, 36, e.g. the height of a vehicle 30, 34 or its trailer, and the horizontal coordinates of the loading/unloading target position 32, 36, e.g. the horizontal position of a vehicle 30, 34 or its trailer. As an example, the detector angle 520 may become smaller when any of the following conditions is satisfied: the loading/unloading target position 32, 36 is low, the height of the load 20 is small and the loading/unloading target position 32, 36 is horizontally close to the one or more detectors 222. Higher loading/unloading target position 32, 36, larger height of the load 20 or horizontally increased distance between the loading/unloading target position 32, 36 and the one or more detectors 222 may be used to increase the detector angle 520.

The system 100 can be implemented as TLMS, also for calibration. As an example of a calibration process sequence, in a truck lane ground job, when the crane has lowered the container successfully on the trailer, an indication can be caused to be transmitted to the system, for example by a programmable logic controller (PLC), that the load is in loading/unloading target position. Similarly, spreader position information may be transmitted. The system may be arranged to always control the detector(s) to follow the spreader until the very end of the grounding of the load. When the system receives the indication, the system can evaluate if the spreader is in such a position, relative to detector(s) of the system, that calibration is possible. If it is, the system can measure spreader reference object(s) and determine the position of the spreader (e.g. x-coordinate, y-coordinate and/or skew: denoted here $x_1$, $y_1$, $s_1$, respectively). Then, the system can take the previous ground job measurement result from its memory ($x_0$, $y_0$, $s_0$). The system can also calculate the bias of spreader measurement, compared to the ground job measurement ($x_{bias}=x_1-x_0$, $y_{bias}=y_1-y_0$, $s_{bias}=s_1-s_0$). The system can then start to compensate its bias in the following spreader measurements ($x_{compensated}=x_{measured}-x_{bias}$, $y_{compensated}=y_{measured}-y_{bias}$, $s_{compensated}=s_{measured}-s_{bias}$).

Any apparatus and/or the system may be implemented in software, hardware, application logic or a combination of software, hardware and application logic. The application logic, software or instruction set may be maintained on any one of various conventional computer-readable media. A "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The databases may be located on one or more devices comprising local and/or remote devices such as servers. The processes described with respect to the exemplary embodiments can include appropriate data structures for storing data collected and/or generated by the processes of the devices and subsystems of the exemplary embodiments in one or more databases.

All or a portion of the exemplary embodiments can be implemented using one or more general purpose processors, microprocessors, digital signal processors, micro-controllers, and the like, programmed according to the teachings of the exemplary embodiments, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

The different functions discussed herein may be performed in a different order and/or concurrently with each other.

Any range or device value given herein may be extended or altered without losing the effect sought, unless indicated otherwise. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An apparatus for providing position control information corresponding to a position of a spreader of a crane and a loading/unloading target position, the apparatus comprising:

one or more detectors for measuring distance; and a transmitter for causing position control information to be transmitted to the crane;

wherein the apparatus is arranged to measure, using the one or more detectors, both the distance to the loading/unloading target position and the distance to the position of the spreader for determining both the loading/unloading target position and the position of the spreader (400) in a fixed coordinate system; and cause, using the transmitter, position control information corresponding to the position of the spreader and the loading/unloading target position to be transmitted to the crane;

wherein the one or more detectors are arranged to be positioned in terminal infrastructure.

2. An apparatus according to claim 1, wherein determining the loading/unloading target position comprises determining the position of a container on a vehicle and/or the position of one or more twistlocks on a vehicle.

3. An apparatus according to claim 1, wherein the loading/unloading target position is determined from a three-dimensional point cloud.

4. An apparatus according to claim 1, wherein the fixed coordinate system is a block coordinate system corresponding to a single block in a terminal.

5. An apparatus according to claim 1, wherein the apparatus is arranged to measure the distance to the position of the spreader when the spreader has been moved by the crane into a measurement space having one or more of the following: a target altitude of the spreader, a threshold for maximum altitude of the spreader and a threshold for minimum altitude of the spreader.

6. An apparatus according to claim 5, wherein the apparatus is arranged to have a field-of-view which simultaneously includes both the measurement space and the loading/unloading target position.

7. An apparatus according to claim 1, wherein the apparatus is arranged to provide position control information for a plurality of loading/unloading lanes at a terminal.

8. An apparatus according to claim 1, wherein the apparatus is arranged to measure, with an additional measurement using the one or more detectors (222), the distance to the position of the spreader when the spreader is coupled to a container for loading/unloading and the container is positioned at the loading/unloading target position.

9. A system for providing position control information for controlling the movement of a spreader of a crane towards a spreader target position, the system comprising:

a first apparatus arranged to be installed in the crane, the first apparatus comprising a receiver for receiving position control information and a controller for controlling the movement of the spreader; and a second apparatus for providing position control information corresponding to a position of the spreader and a loading/unloading target position, the second apparatus comprising one or more detectors for measuring distance and a transmitter for causing position control information to be transmitted to the first apparatus;

wherein the second apparatus is arranged to measure, using the one or more detectors, both the distance to the loading/unloading target position and the distance to the position of the spreader for determining both the loading/unloading target position and the position of the spreader in a fixed coordinate system; and cause, using the transmitter, position control information corresponding to the position of the spreader and the loading/unloading target position to be transmitted to the first apparatus wherein the one or more detectors are arranged to be positioned in terminal infrastructure.

10. A system according to claim 9, wherein the first apparatus is arranged to direct the spreader into a measurement space for determination of the position of the spreader.

11. A system according to claim 9, wherein the first apparatus is arranged to slow or stop the movement of the spreader for determination of the position of the spreader.

12. A system according to claim 9, wherein the system is arranged, when a container is carried by the spreader, to use position control information corresponding to the position of the spreader to determine, in the fixed coordinate system, an outer boundary of the container.

13. A system according to claim 9, wherein the first apparatus comprises one or more inclination sensors for measuring the inclination of the spreader.

14. A system according to claim 9, arranged to calibrate the determination of the position of the spreader using a measured distance to the position of the spreader when the spreader is coupled to a container for loading/unloading and the container is positioned at the loading/unloading target position.

15. A method of providing position control information for controlling the movement of a spreader of a crane towards a spreader target position, the method comprising:

measuring both the distance to the loading/unloading target position and the distance to a position of the spreader for determining both a loading/unloading target position and the position of the spreader in a fixed coordinate system; and causing position control information corresponding to the position of the spreader and the loading/unloading target position to be transmitted to the crane wherein the measurement is performed using one or more detectors which are arranged to be positioned in terminal infrastructure.

16. A method according to claim 15, comprising:

measuring, with an additional measurement, the distance to the position of the spreader when the spreader is coupled to a container for loading/unloading and the container is positioned at the loading/unloading target position.

* * * * *